CORRECTION FACTOR $\frac{1}{K_0}$ VS. ALTITUDE

OXYGEN PERCENTAGE IN AIR VS. TIME
OF EXPOSURE FOR SAFE LEVELS

CO₂ CONCENTRATION IN AIR AT SEA LEVEL VS. TIME

PERCENT OF TOLERABLE CO OR CO₂
CONCENTRATION VS. ALTITUDE

ALTITUDE VS. RECIPROCAL CORRECTION FACTOR $\frac{1}{KC}$

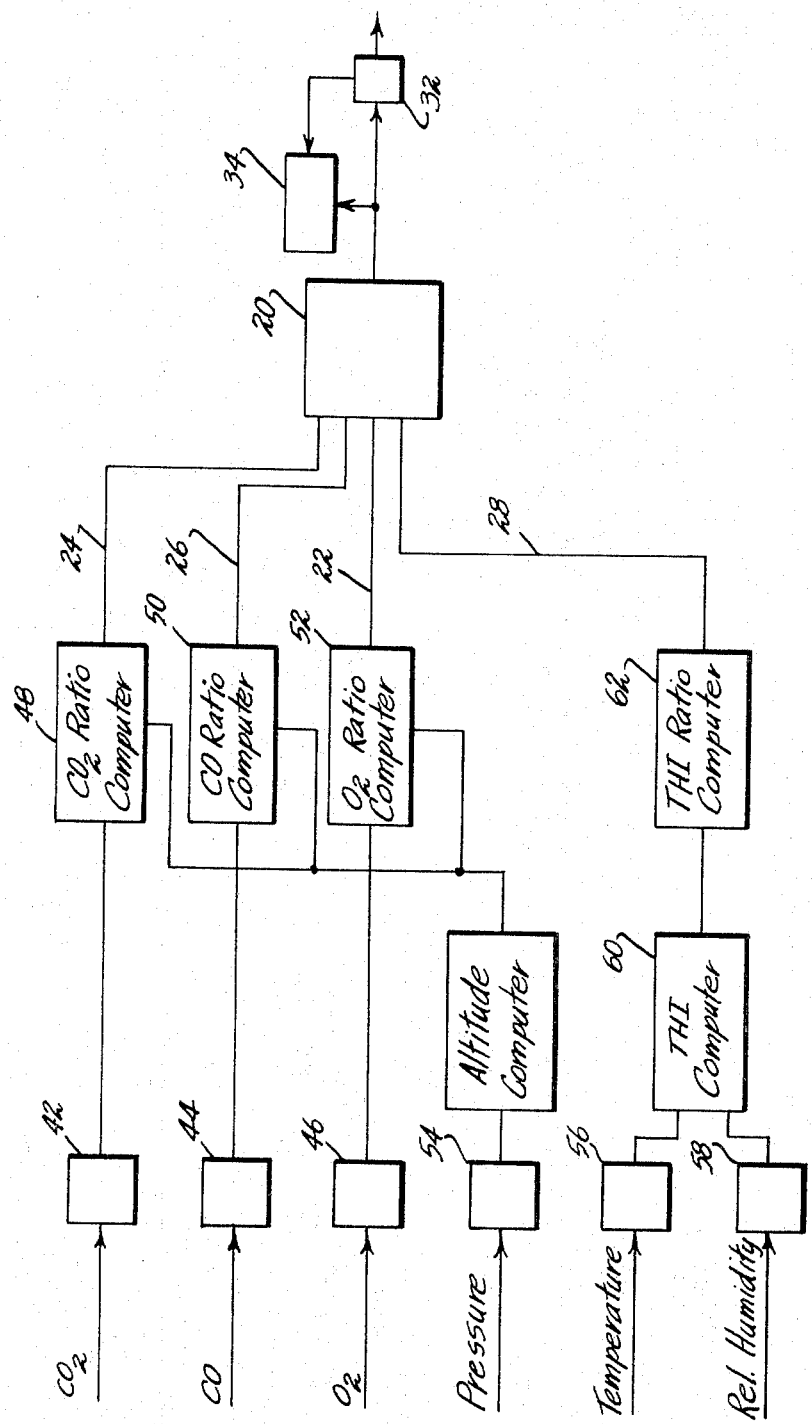

3,364,476
INTERACTION ANALYZER
Elliott H. Kahn, Brooklyn, N.Y., assignor, by mesne assignments, to the United States of America as represented by the Secretary of the Navy
Filed June 4, 1964, Ser. No. 372,728
3 Claims. (Cl. 340—213)

This invention relates to an interaction analyzer and particularly to a means to evaluate the environmental parameters with respect to the total physiological stress to which occupants of a chamber are subjected.

Training of aircraft flight crews under simulated altitude conditions is generally conducted in altitude chambers, where the ambient environment (pressure, oxygen, temperature, etc.) may be made compatible with that of the training mission. If the trainees are instrumented, the onset of an adverse reaction may be noted and corrective action taken by the chamber operator. On the other hand, if the training exercise precludes instrumenting the trainee, medical specialists must be available and alert to any indication of an adverse reaction or physiological compensation. Such reactions originate in the control centers associated with the psycho-physiological stresses that result from all the conditions of the training exercise. These include the activity of the trainees, hypoxia, reduced pressure, the toxic effect of gases in the ambient environment, temperature, humidity, and the duration of the exercise.

The design requirements of any instrumentation used requires (1) monitoring of the individual gas levels within the altitude chamber, together with the ambient temperature, humidity, and pressure environment; and (2) alerting the chamber operator when the environmental parameters are such that potentially dangerous conditions are reached. The instrumentation must not only sense potentially dangerous conditions on an individual environmental parameter basis, but also on an integrated, synergistic basis, where the effect of cooperative factors is greater than the sum of discrete factors.

It is an important object of the invention to provide means to compute the interaction of various environmental parameters to enable stress physiological conditions to be recognized before danger levels have been reached.

It is another object to provide both a tool usable in training personnel in altitude chambers, but also one that will be of more general utility as a tool for fundamental research in physiological reaction.

It is another object to provide a process that is capable of modification to include the latest developed data on the subject.

It is yet another object to provide a format based on the interacting effect of the several stress causing effects that minimizes the range of possible errors.

It is still another object to obtain a physiological stress formula that reflects the important environmental parameters whereby changing of environmental values will unerringly alert individuals to excessive stress conditions.

Other objects and many of the attendant advantages of this invention will be readily appreciated as the same becomes better understood by reference to the following detailed description when considered in connection with the accompanying drawings wherein:

FIG. 13 illustrates in block diagram the interaction computer of FIG. 12 and sensor and computer means supplying inputs to the interaction computer.

Each environmental parameter contributes to the total physiological stress to which the chamber occupants are subjected. For this purpose, four parameters are considered significant:

(a) $O_2$ concentration
(b) CO concentration
(c) $CO_2$ concentration
(d) The Temperature-Humidity Index (THI)

The combined physiological effect of these four parameters is a function of time of exposure, pressure altitude, and mutual inter-action. The mutual interaction effect will now be described.

The region where interaction among the parameters is of concern is limited to the domain between the initial onset of stress and the maximum allowable stress. When the gas concentration (or THI) is below the onset-of-stress level there is essentially no interaction contributed by that parameter. Obviously, when an individual parameter exceeds the maximum allowable stress, the danger level has been reached, regardless of the concentrations of the other parameters.

Although detailed physiological interaction equations for the parameters concerned have not been specifically established in the literature, experience in physical and physiological sciences with interacting effects permits an interaction approach that is within the permissible engineering accuracy and the desired margin of safety. This approach, described hereafter, provides a tool that will not only permit the training of personnel in altitude chambers, but will also be useful for fundamental research in physiological interaction. The instrumentation is so designed that it can be readily modified to include the latest data.

In the physical and physiological sciences, the interacting effect of several stress-causing effects may be evaluated by equations of the form of:

$$A\left(\frac{P_1}{P_{1\,max}}\right)^a + B\left(\frac{P_2}{P_{2\,max}}\right)^b + \cdots N\left(\frac{P_n}{P_{n\,max}}\right)^n \leq 1$$

where:

$P_1 \ldots P_n$ are prevailing stress parameters,
$P_{1\,max} \ldots P_{n\,max}$ are the maximum permissible values of each of these parameters (excluding the effects of all other parameters),
$A \ldots N$ are the weighting coefficients and
$a \ldots n$ are the weighting exponents designating weight-in factors which define relative inequalities of stress.

This format tends to minimize the range of possible errors. For example, consider two stresses acting on a body and having no interaction whatsoever. This may be expressed by:

$$\left(\frac{P_1}{P_{1\,max}}\right)^{m \to \infty} + \left(\frac{P_2}{P_{2\,max}}\right)^{m \to \infty} \leq 1$$

Figure 1:
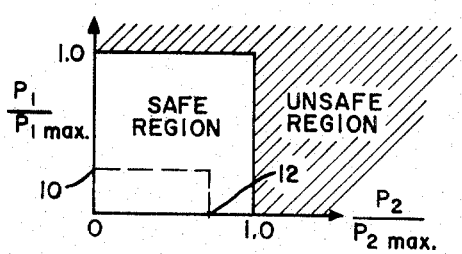
FIGS. 1, 2, 3 and 4 represent graphically the effects of various stress conditions.

The formula is graphically illustrated in FIG. 1 where any value of $P_1$ less $P_{1\,max}$, as shown at 10 may be tolerated in the presence of any value of $P_2$ less than $P_{2\,max}$, as shown at 12, thus describing the case of zero interaction.

A typical interaction, where the effects of two stresses are equally significant in contributing to a total level of stress, is given by:

$$\left(\frac{P_1}{P_{1\,max}}\right)+\left(\frac{P_2}{P_{2\,max}}\right)\leq 1$$

Figure 2:
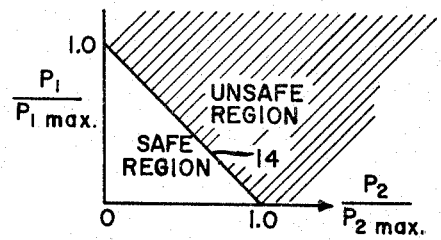

The illustration of FIG. 2 depicts a straight line graph 14 to mark the safe region where equal stress exists.

Figure 3:
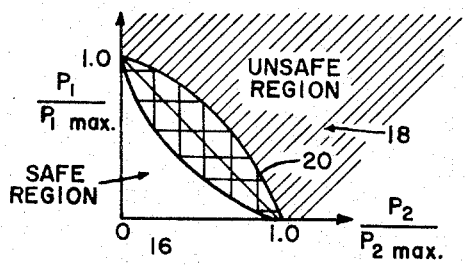

Most physical applications tend to conform approximately to this type of interaction curve, and is described in FIG. 3. The safe region 16 is separated from the unsafe region 18 by a region of interaction 20. This is the period when stress continues, but is short of actual danger.

Figure 4:
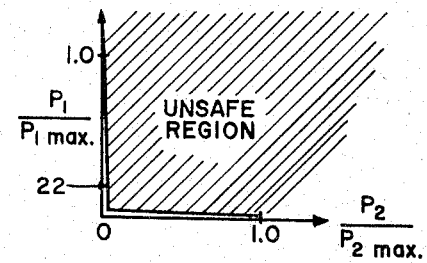
Figure 6:
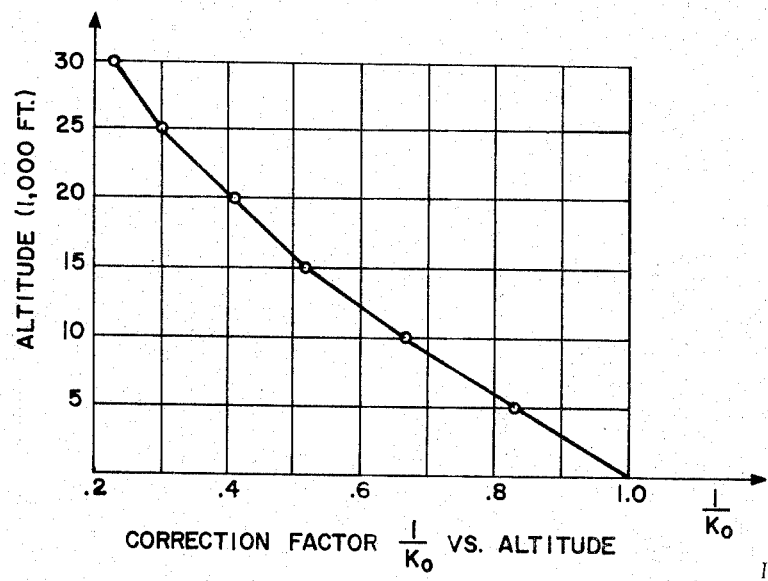
FIG. 6 is a table illustrating the reciprocal multiplying factor $(1/K_o)$ for oxygen concentration as against altitude.
Figure 5:
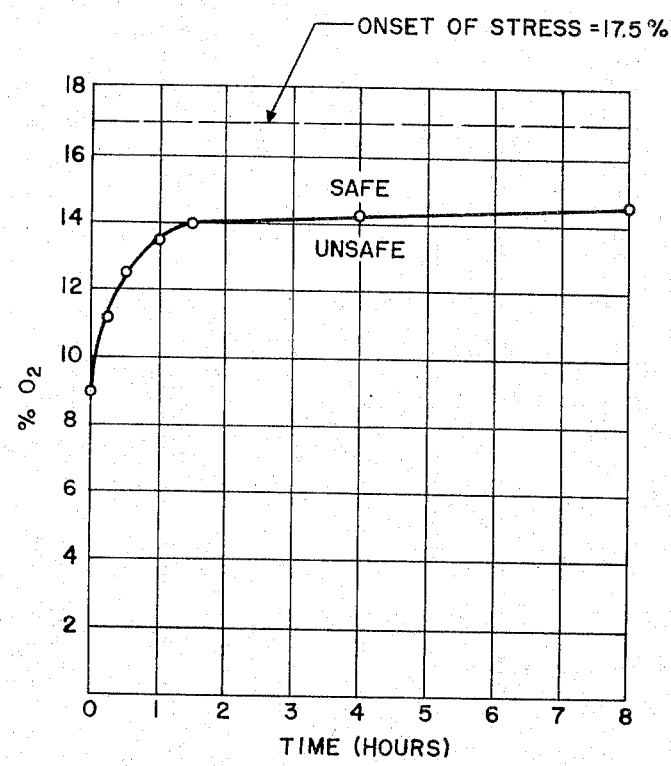
FIG. 5 is a table showing oxygen concentration of air as against time at sea level.

An extreme case of interaction exists where an intolerable stress is reached by combining even relatively small stresses from one parameter in the presence of stress from another parameter. This rather extreme limit does not apply per se to the particular situation under consideration, but is cited merely to indicate the versatility of the interaction approach. Under these conditions, the equation becomes:

$$\left(\frac{P_1}{P_{1\,max}}\right)^{\infty\to 0}+\left(\frac{P_2}{P_{2\,max}}\right)^{\infty\to 0}\leq 1$$

and is shown in FIG. 4 where the safe region is obtained at 22.

It is set as:

$$\frac{P_n}{P_{n\,max}}=R_n$$

the stress formula becomes $$AR_1^a+BR_2^b+\ldots NR_n^n\leq 1$$

In the altitude chamber environment, the three gas parameter ratios ($R_{O_2}$, $R_{CO}$ and $R_{CO_2}$) are considered to have relatively equal significance, and accordingly, we set the associated coefficients (A, B . . .) and exponents (a, b . . .) at unity. The effects of THI within the range of values under consideration may be closely approximated by introducing a factor of four as the exponent of the THI term in the stress formula. This factor describes a condition in which low values of THI stress are given relatively insignificant weighting in the stress summation, but in which higher values of THI stress are properly accorded heavier weighting, consonant with their associated physical effects. THI affects body chemistry indirectly—by stressing the body temperature regenerating system—while the gas environment, by contrast, affects the body chemistry directly. The physiological stress formula, or synergism index, may therefore be expressed as:

$$R_{O_2}+R_{CO}+R_{CO_2}+R^4_{THI}=\leq 1 \text{ (or } \Sigma R)$$

To arrive at proper stress ratios, it must be emphasized that numerator and denominator $P_n$ and $P_{n\,max}$ are defined with respect to the stress threshold. Taking oxygen as an example, it has already been noted that no physiological stress is experienced at altitudes up to about 5000 feet; accordingly, at sea level, the oxygen concentration could be as low as 17.5% before the onset of stress occurs. Similarly, the onset of stress for $CO_2$ concentration, at sea level, does not exceed 1.0%. Therefore, all stress and stress ratios are computed with respect to the threshold.

FIGS. 5–11 represent individual curves for oxygen, carbon dioxide, carbon monoxide and temperature-humidity index. The terms are in percent concentrations at sea level pressure, rather than in terms of altitude. However, the relationship between partial pressure and percent concentration at sea level is very straightforward.

Some sample calculations will be given to illustrate the the method of computing stress ratio:

*Example I*

The following environment will be used:
CO=0.0715%
$CO_2$=3.2300%
$O_2$=16.65%
THI=81

The following nomenclature will be used in the calculations:

$\Sigma R$ = overall stress ratio
$R_x$ = stress ratio of any component, where $x$=CO, $CO_2$, $O_2$, or THI
$1/K_o=K'_o$ = correction factor for oxygen versus altitude
$1/K_c=K'_c$ = correction factor for CO and $CO_2$ versus altitude The general formula is shown in col. 3, line 50.

$$\Sigma R = R_{CO}+R_{CO_2}+R_{O_2}+(R_{THI})^4 \text{ and}$$

Substituting for the individual stress ratios, $$\Sigma R = \frac{K'_c(\text{CO actual}-\text{CO thresh})}{\text{CO max}-\text{CO thresh}}$$
$$+\frac{K'_c(CO_2\text{ actual})-CO_2\text{ thresh}}{CO_2\text{ max}-CO_2\text{ thresh}}$$
$$+\frac{O_2\text{ thresh}-K'_o(O_2\text{ actual})}{O_2\text{ thresh}-O_2\text{ minimum}}$$
$$+\left(\frac{\text{THI actual}-\text{THI thresh}}{\text{THI maximum}-\text{THI thresh}}\right)^4$$

A

Consider the case at sea level, time at 0.0 hours. The following values apply:
CO thresh=0.002%
CO minimum=0.2%
$CO_2$ thresh=0.5%
$CO_2$ maximum=10.5%
$O_2$ thresh=17.5%
$O_2$ minimum=9.0%
THI thresh=75
THI maximum=100

Substituting these values into the equation:

$$\Sigma R=\frac{1(.0715)-.002}{0.2-.002}+\frac{1(3.23)-0.5}{10-0.5}$$
$$+\frac{17.5-1(16.65)}{17.5-9}+\left(\frac{81-75}{100-75}\right)^4$$
$$\Sigma R=\frac{0.0695}{.198}+\frac{2.73}{9.5}+\frac{0.85}{8.5}+\left(\frac{6}{25}\right)^4$$
$$=0.351+0.288+0.100+0.003$$

$\Sigma R=0.742$, which is a safe condition.

B

For an altitude of 1120 feet, time zero, the initial conditions are the same as at sea level, except that $K'_c=1.10$ and $K'_o=0.957$.

Then:

$$\Sigma R=\frac{(1.1)(.0715)-.002}{.198}+\frac{(1.1)(3.23)}{9.5}$$
$$+\frac{0.5+17.5-(0.957)(16.65)}{8.5}+0.003$$

$\Sigma R=0.389+0.321+0.187+0.003$
$\Sigma R=0.9$

This is a caution condition.

*Example II*

The following is a sample calculation showing the altitude at which one of the gas components causes a stress of 0.0715% at 0.0 hour.

$$R_{CO}=1=\frac{K'_c\cdot CO_{alt}-CO_{thresh}}{CO_{max}-CO_{thresh}}$$

$$K'_c=\frac{CO_{max}}{CO_{alt}}=\frac{0.2}{0.0715}=2.8$$

Figure 9:
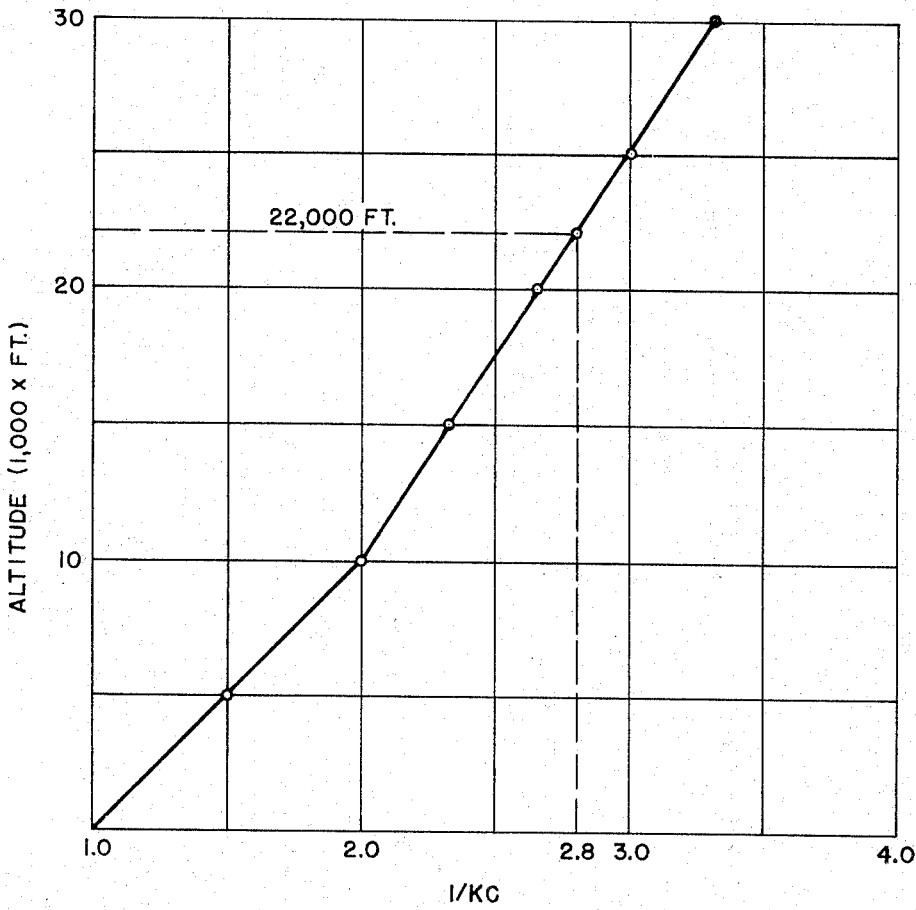
FIG. 9 illustrates the altitude against the reciprocal correction factor $(1/K_c)$.
Figure 10:
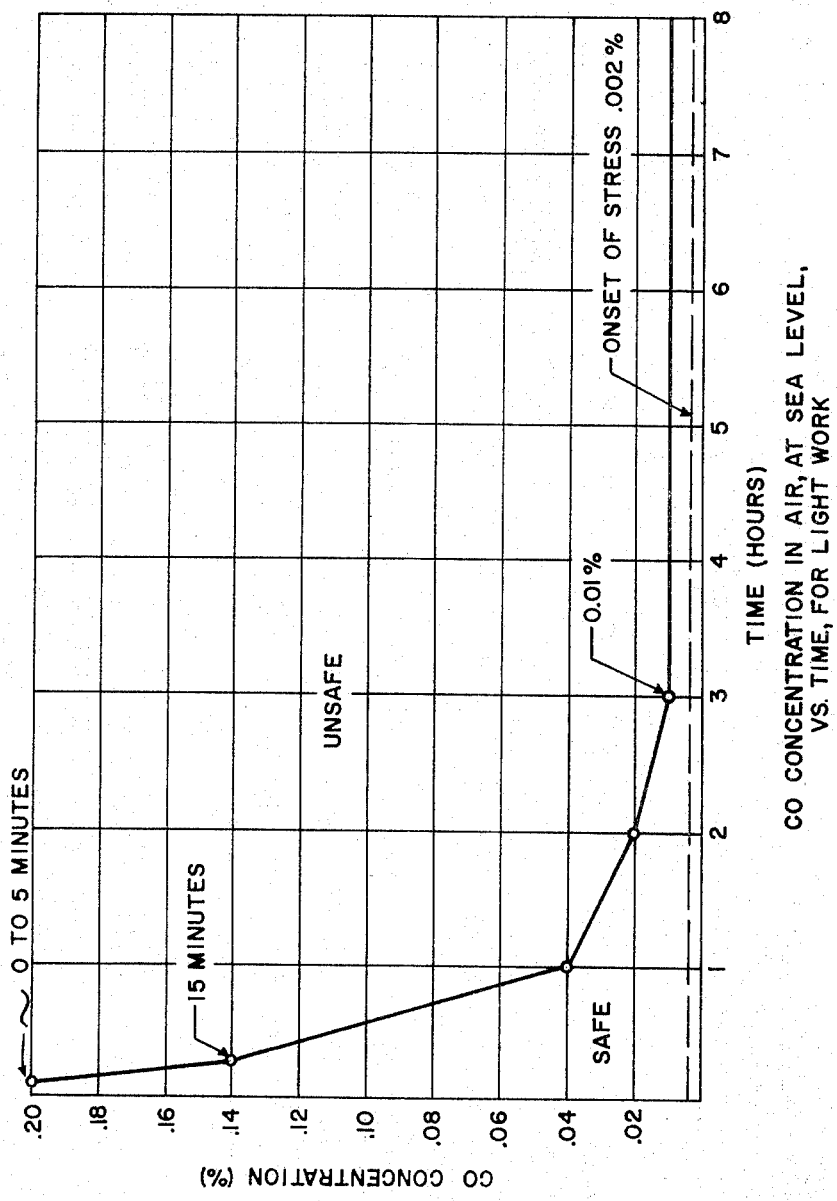
FIG. 10 illustrates CO concentration of air against time and at sea level.
Figure 11:
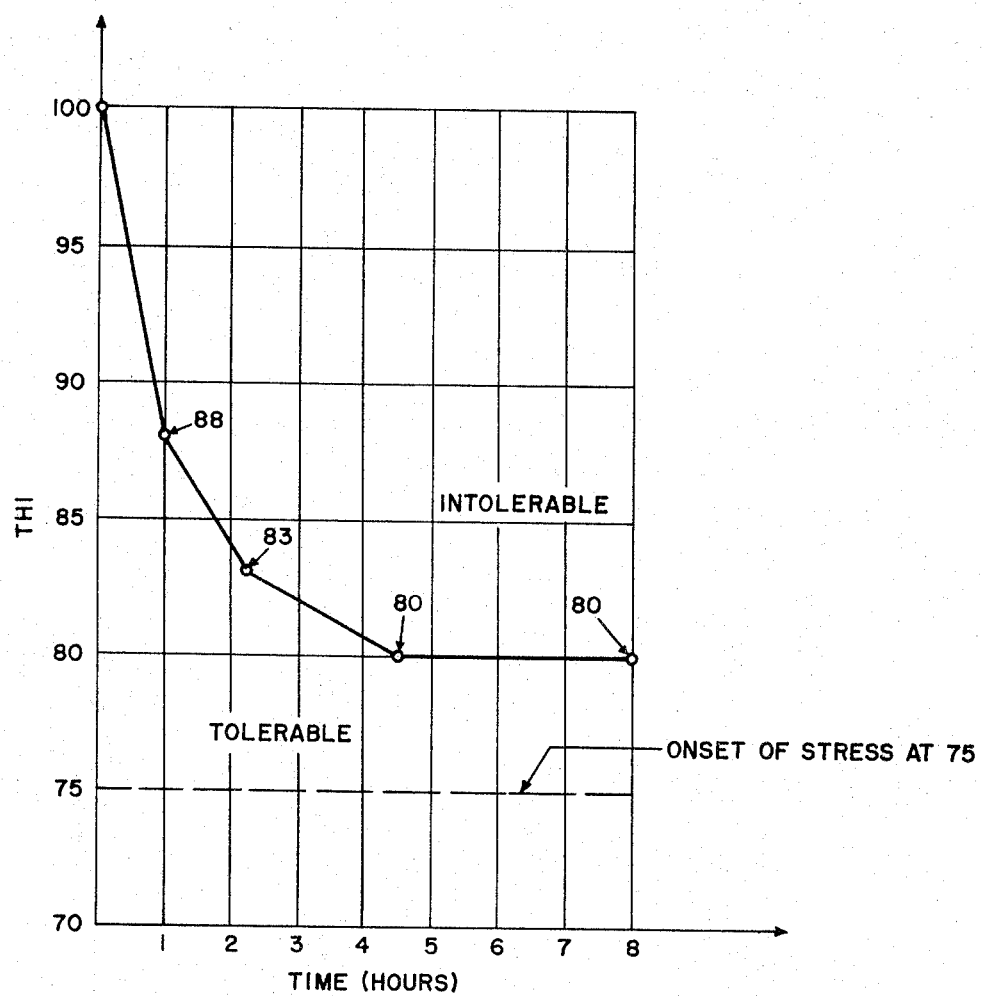
FIG. 11 illustrates the temperature humidity index (THI) against time at body level.

$K'_c=2.8$ at an altitude of 22,000 feet (refer to FIG. 9). Therefore, $R_{CO}=1$ at 22,000 feet for a concentration of 0.0715% at 0.0 hour.

*Example III*

At a period of six minutes, the system response to time is as follows:

Environment:
CO=0.715%
$CO_2$=3.23%
$O_2$=16.65%
THI=81

At time=6 minutes:

CO max.=0.194%
$CO_2$ max.=6.8%
$O_2$ min.=0.89%
THI max.=98.8

Therefore:

$$\Sigma R = \frac{0.0715 - 0.002}{0.194 - 0.002} + \frac{3.23 - 0.50}{6.80 - 0.50} + \frac{17.5 - 16.65}{17.5 - 9.89} + \left(\frac{81 - 75}{98.8 - 75}\right)^4$$

$\Sigma R = 0.36 + 0.43 + 0.11 + 0.004$
$\Sigma R = 0.9$, approximately.

*Example IV.—Calculation for THI variation*

For the initial condition, a value for THI is selected below the threshold value, so that the stress ratio due to THI=0. Therefore, the stress ratio measured is that which corresponds to the room ambient gas concentrations. This is represented by $SR_A$ (initial condition of ambient which may be above $\Sigma R=0$).

When THI is increased to 93.5, $$(R_{THI})^4 = \left(\frac{93.5 - 75}{100 - 75}\right)^4 = \left(\frac{18.5}{25}\right)^4 = 0.3$$

The $\Sigma R$ when $THI=93.5$ would then be $0.3 + SR_A$.

Thus, to complete the synergistic effect (physiological) on an individual, due to his environment, a stress ratio summation is computed according to the formula:

$$S_t = \Sigma^{w}{}_{a_i}(S_i)^{b_i}$$

where $S_t$=total stress ratio
$a_i$ and $b_i$=environmental constants
$S_i$=stress ratio due to the environmental constant $i$.

Figure 12:
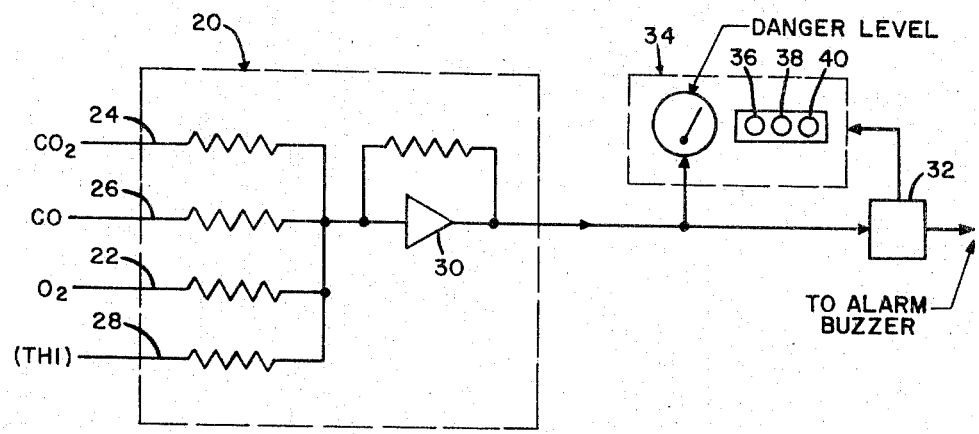
FIG. 12 illustrates the interaction computer.
Figure 7:
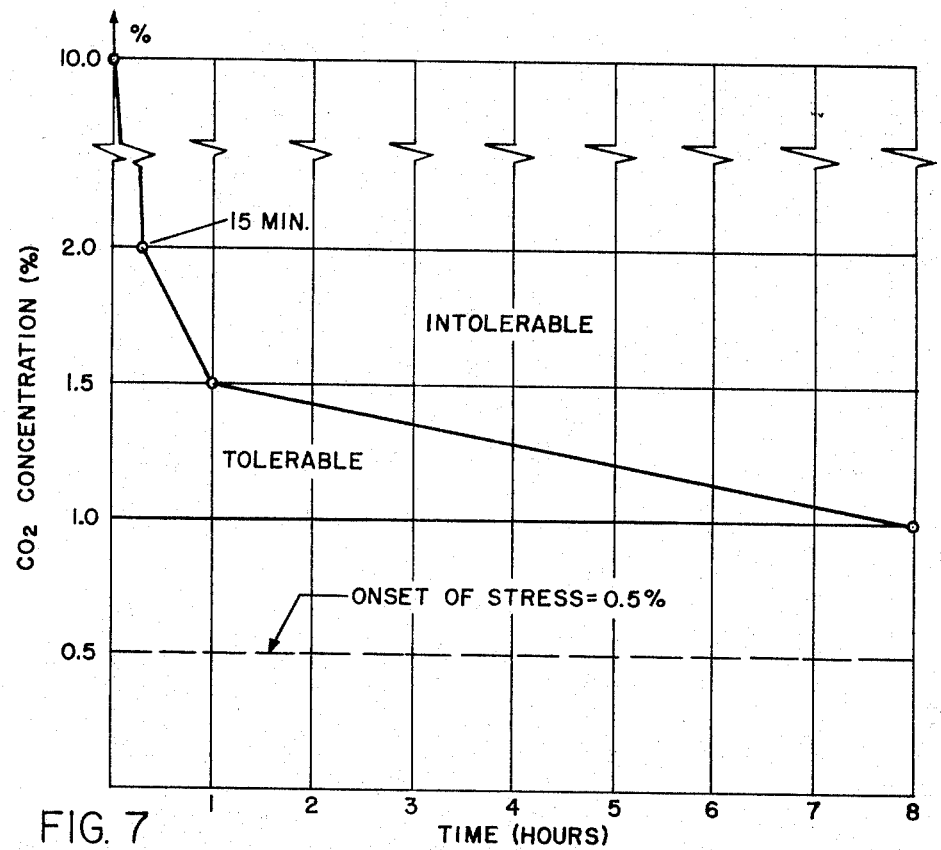
FIG. 7 is a table illustrating carbon dioxide concentration against time.
Figure 8:
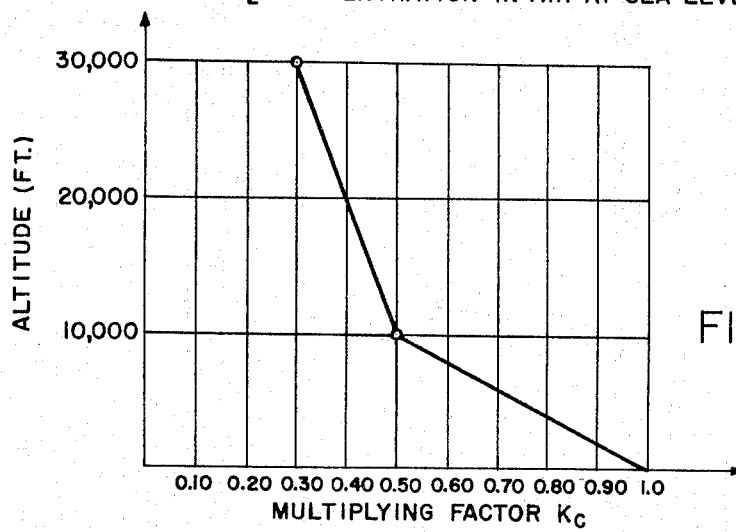
FIG. 8 illustrates the multiplying factor $K_c$ for carbon monoxide in carbon dioxide against altitude.

The interaction computer is illustrated schematically in FIG. 12 and in block diagram in FIG. 13. FIG. 13 also illustrates the sensor and ratio computer means supplying input to the interaction computer 20. Thus, referring to FIGS. 12 and 13, the output of the oxygen ratio computer 52 is fed to the interaction computer 20 at 22. In a like manner the outputs of the CO, $CO_2$ and THI ratio computers 50, 48 and 62 are fed to computer 20 at 26, 24, and 28, respectively. 60 indicates the THI computer for comparing temperature and relative humidity. The voltage produced is amplified at 30 and the output:

$$\Sigma_O = R_{CO} + R_{CO_2} + R_{O_2} + (R_{THI})^4$$

is fed to the danger level alarm circuit 32 which feeds signals to the visual display box 34 on the console (not shown). (It will be noted from the formula $\Sigma_O$ that the constant $a_i$ is equal to 1.0 for the environments CO, $CO_2$, $O_2$ and THI. Constant $b_i$ is equal to 1.0 for CO, $CO_2$ and $O_2$ and is equal to 4 for THI.) A relay meter with two sets of contacts and associated logic lights the green lamp 36, when there is no danger; lights the amber warning lamp 38 and lights the red lamp 40 when the safe level is exceeded. When $\Sigma_O$ exceeds a value of unity, the alarm buzzer is sounded. The several sensor means for $CO_2$, CO, $O_2$, pressure, temperature and relative humidity are indicated respectively at 42, 44, 46, 54, 56 and 58.

Obviously many modifications and variations of the present invention are possible in the light of the above teachings. It is therefore to be understood that within the scope of the appended claims the invention may be practiced otherwise than as specifically described.

What is claimed is:

1. Apparatus for indicating the anticipated summation effect on a human body of an environment comprising a plurality of gases and a THI factor applied simultaneously to the human body in varying ratios of concentrations comprising in combination;
   (a) sensor and ratio computer means for sensing and simultaneously measuring the concentration of each of said gases and producing for each gas a corresponding output voltage,
   (b) sensing and ratio computer means for sensing and simultaneously measuring said THI factor and producing a corresponding output voltage,
   (c) a summing amplifier operatively connected to simultaneously receive said output voltages and provide an electrical output signal which is a function of said combined computer output signals, and
   (d) indicator means operatively connected to receive said amplifier output signal and to provide indication of the value of said amplifier output signal to thereby continuously indicate the parameter of safe and danger conditions of said measured environment.

2. Apparatus as set forth in claim 1;
   (a) said gases including carbon dioxide, carbon monoxide and oxygen.

3. Apparatus as set forth in claim 1;
   (a) said indicator means including a visual display box having relay meter means and a plurality of light indication means to indicate conditions of human stress from safe to danger levels.

References Cited

UNITED STATES PATENTS

| | | | |
|---|---|---|---|
| 2,540,807 | 2/1951 | Berry | 235—150.2 X |
| 3,128,375 | 4/1964 | Grimnes | 235—150.2 |
| 3,210,749 | 10/1965 | Magor | 340—213 |

THOMAS B. HABECKER, *Acting Primary Examiner.*

NEIL C. READ, *Examiner.*

R. ANGUS, D. YUSKO, *Assistant Examiners.*